(12) United States Patent
Tachibana

(10) Patent No.: US 8,484,345 B2
(45) Date of Patent: Jul. 9, 2013

(54) COMMUNICATION CONTROL APPARATUS, COMMUNICATION CONTROL SYSTEM, AND COMMUNICATION CONTROL METHOD

(75) Inventor: Masazumi Tachibana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 13/091,524

(22) Filed: Apr. 21, 2011

(65) Prior Publication Data

US 2011/0196967 A1    Aug. 11, 2011

Related U.S. Application Data

(63) Continuation of application No. PCT/JP2008/069151, filed on Oct. 22, 2008.

(51) Int. Cl.
*G06F 15/16* (2006.01)
(52) U.S. Cl.
USPC .......................... 709/225; 709/203
(58) Field of Classification Search
USPC ................................. 709/203, 225
See application file for complete search history.

(56) References Cited

U.S. PATENT DOCUMENTS

| 6,345,294 B1 * | 2/2002 | O'Toole et al. | 709/222 |
| 2004/0255033 A1 | 12/2004 | Edney et al. | |
| 2009/0187646 A1 * | 7/2009 | Hokkyo et al. | 709/221 |

FOREIGN PATENT DOCUMENTS

| JP | 05-056050 | 3/1993 |
| JP | 09-331325 | 12/1997 |
| JP | 2005-348145 | 12/2005 |
| JP | 2006-087132 | 3/2006 |
| JP | 2006-197051 | 7/2006 |

OTHER PUBLICATIONS

International Search Report for PCT/JP2008/069151, mailed Nov. 25, 2008.

* cited by examiner

*Primary Examiner* — Kevin Bates
(74) *Attorney, Agent, or Firm* — Staas & Halsey LLP

(57) ABSTRACT

A communication control system includes a terminal apparatus and a maintenance terminal apparatus. The terminal apparatus includes a determining unit that selects an address of the terminal apparatus from addresses other than an address of a communication destination to determine the address used for the transmission and reception of data, the communication destination defining network positional information of the maintenance terminal apparatus; a discarding unit that discards an address resolution request; and a communication unit that transmits data only to the address of the communication destination and receives only the data from the address of the communication destination. The maintenance terminal apparatus includes a communication unit that provides maintenance data through the communication with the terminal apparatus; and a setting unit that stops an address resolution process for the address of the terminal apparatus during the communication with the terminal apparatus.

8 Claims, 13 Drawing Sheets

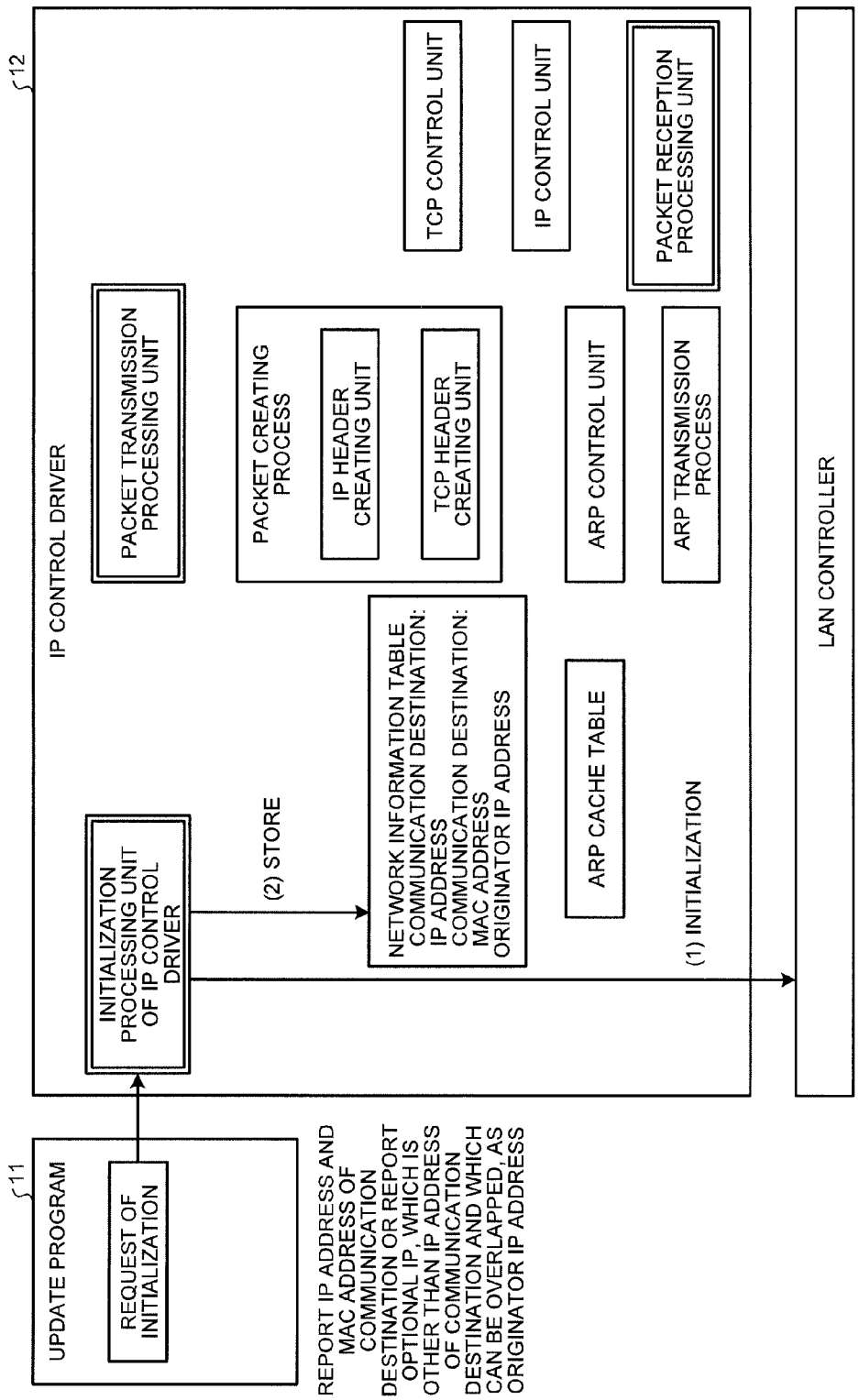

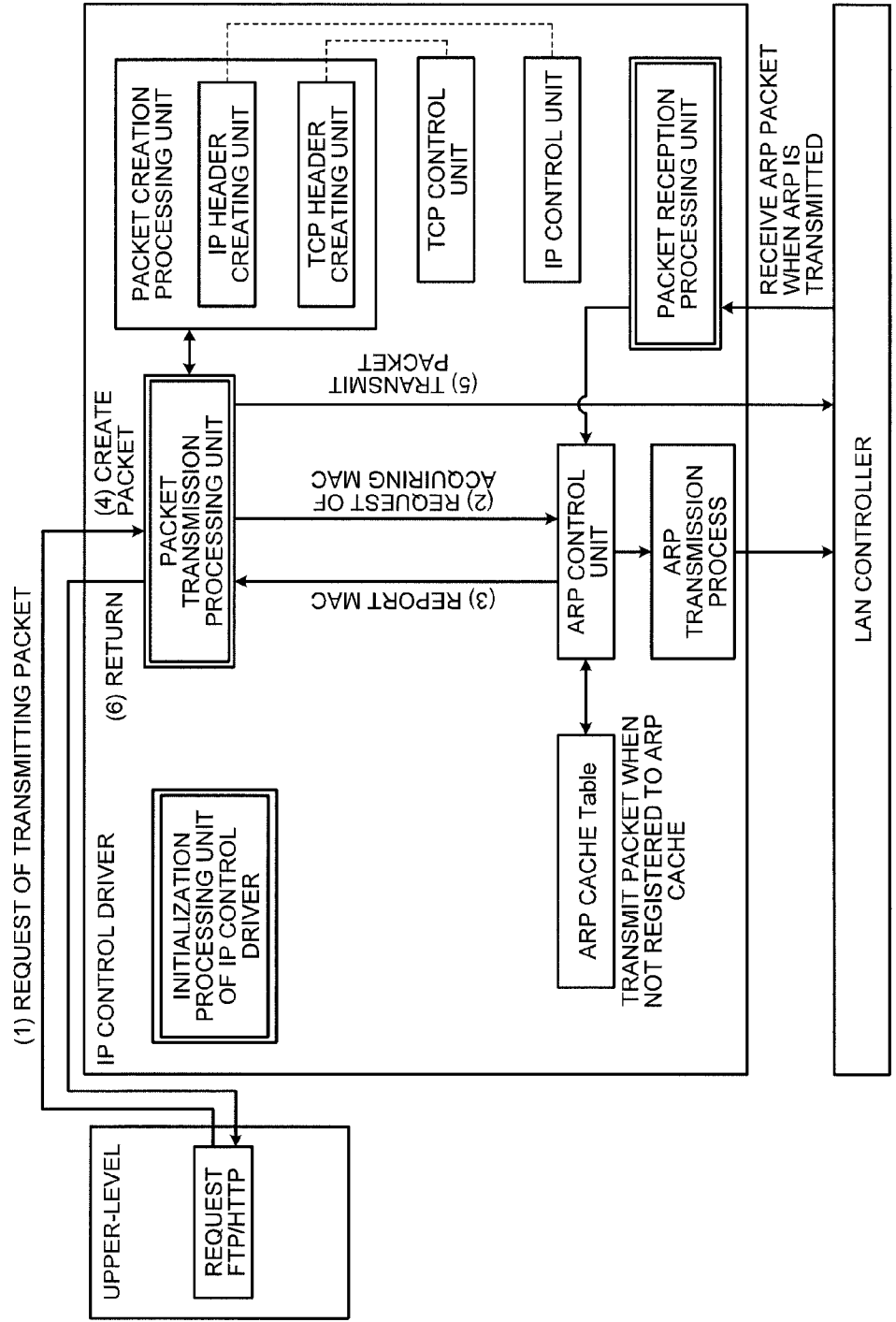

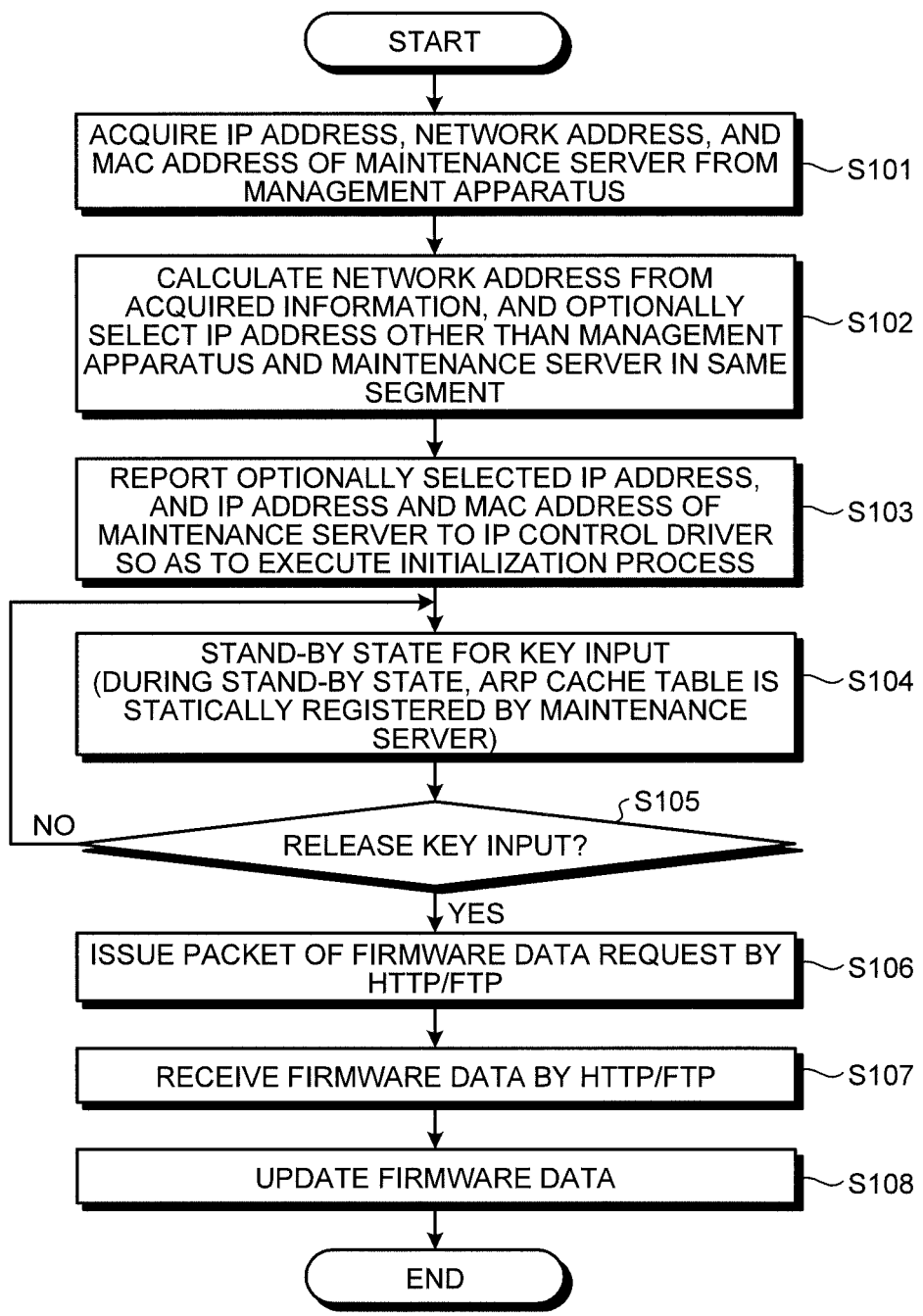

COMMUNICATION CONTROL APPARATUS, COMMUNICATION CONTROL SYSTEM, AND COMMUNICATION CONTROL METHOD

CROSS-REFERENCE TO RELATED APPLICATION

This application is a continuation of International Application No. PCT/JP2008/069151, filed on Oct. 22, 2008, the entire contents of which are incorporated herein by reference.

FIELD

The embodiment discussed herein is directed to a communication control apparatus, a communication control system, and a communication control method.

BACKGROUND

In a network communication represented by a Internet Protocol (IP) network, it is supposed that an address (IP address in the IP network) that is not overlapped is allocated to respective terminal apparatuses.

When the IP address is overlapped, the terminal apparatus to which the overlapped IP address is allocated cannot normally make communication. An address resolution protocol (ARP) has been known as a technique of detecting the overlap of the address (e.g., see Japanese Laid-open Patent Publication No. 5-56050).

Specifically, in the ARP, a broadcast packet is transmitted so as to send the originator IP address to all terminal apparatuses. When the transmitted packet reaches the terminal apparatus having the overlapped IP address, the overlap of the IP address can be detected.

When data necessary for update is acquired through the IP network in case where firmware data of the terminal apparatus connected to the IP network is updated, it is necessary to assign the IP address to the terminal apparatus that is the subject to be updated. The assignment of the IP address is performed such that an operator firstly selects a usable IP address, and then, manually inputs the selected IP address to the subject apparatus whose firmware data is to be updated.

However, when an error is caused in the selection of the IP address or in the input, the IP address of the terminal apparatus that is the subject to be updated and the IP address of the other terminal apparatus that has already been installed might be overlapped.

When a new terminal apparatus is added to make an IP communication with a specific device in the state in which all IP addresses in a segment have already been assigned, the IP address might be overlapped with the IP address of any one of the terminal apparatuses in the segment.

There is also an environment in which the IP address is not managed. When the IP communication is needed in the environment in which the IP address is not managed, an optional IP address, which is considered not to be used, is selected and assigned to the address of the own terminal. However, there may be the case in which the selected address has already been used in the other terminal apparatus.

Whether an IP address has already been used or not is generally determined whether there is a response in Ping or not. However, a device that does not respond to Ping increases due to the implementation of firewall software to a computer system.

Therefore, even the selected IP address that is considered not to be used because of no response to the Ping might be overlapped.

The IP communication is sometimes demanded between specific terminal apparatuses, even when the IP addresses might be overlapped as described above. There has been proposed a method, as a method of the IP communication allowing the overlap of the IP address, in which a proxy response apparatus is added between network, wherein identification information of a slave device is converted into an IP address by the proxy response apparatus, and an IP packet is transmitted to another network (see, for example, Japanese Laid-open Patent Publication No. 9-331325).

However, in a conventional technique, a normal communication cannot be made, when addresses are overlapped in a segment. For example, even when a proxy response apparatus is used, an IP address that is not overlapped has to be assigned to a connection part between the proxy response apparatus and the network of a communication destination. There is also a problem that an apparatus for performing a proxy response is needed.

In view of this, an important problem is the implementation of a control method in which an IP communication can be made between specific terminal apparatuses without giving influence to communication to other terminal apparatus, even if an overlap is caused due to an erroneous selection or erroneous input of an address.

SUMMARY

According to an aspect of an embodiment of the invention, a communication control system includes a terminal apparatus that is connected to an IP network and a maintenance terminal apparatus that is connected to the IP network. The terminal apparatus includes a transmission/reception address determining unit that selects an address of the terminal apparatus from addresses other than an address of a communication destination to determine the address used for the transmission and reception of data, the communication destination defining network positional information of the maintenance terminal apparatus; an address resolution request discarding unit that discards an address resolution request; and a communication unit that transmits data only to the address of the communication destination, and receives only the data from the address of the communication destination. The maintenance terminal apparatus includes a communication unit that provides maintenance data through the communication with the terminal apparatus; and a static address setting unit that stops an address resolution process that is performed in response to an address resolution request for the address of the terminal apparatus during the communication with the terminal apparatus.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 7 is an explanatory view illustrating an initialization process of an IP control driver, when the terminal apparatus updates the firmware;

FIG. 8A is an explanatory view illustrating a packet transmission process of a conventional IP control driver;

FIG. 11 is a flowchart for describing an operation of an update program 11.

DESCRIPTION OF EMBODIMENT

A preferred embodiment of the present invention will be explained with reference to accompanying drawings.

Figure 1:
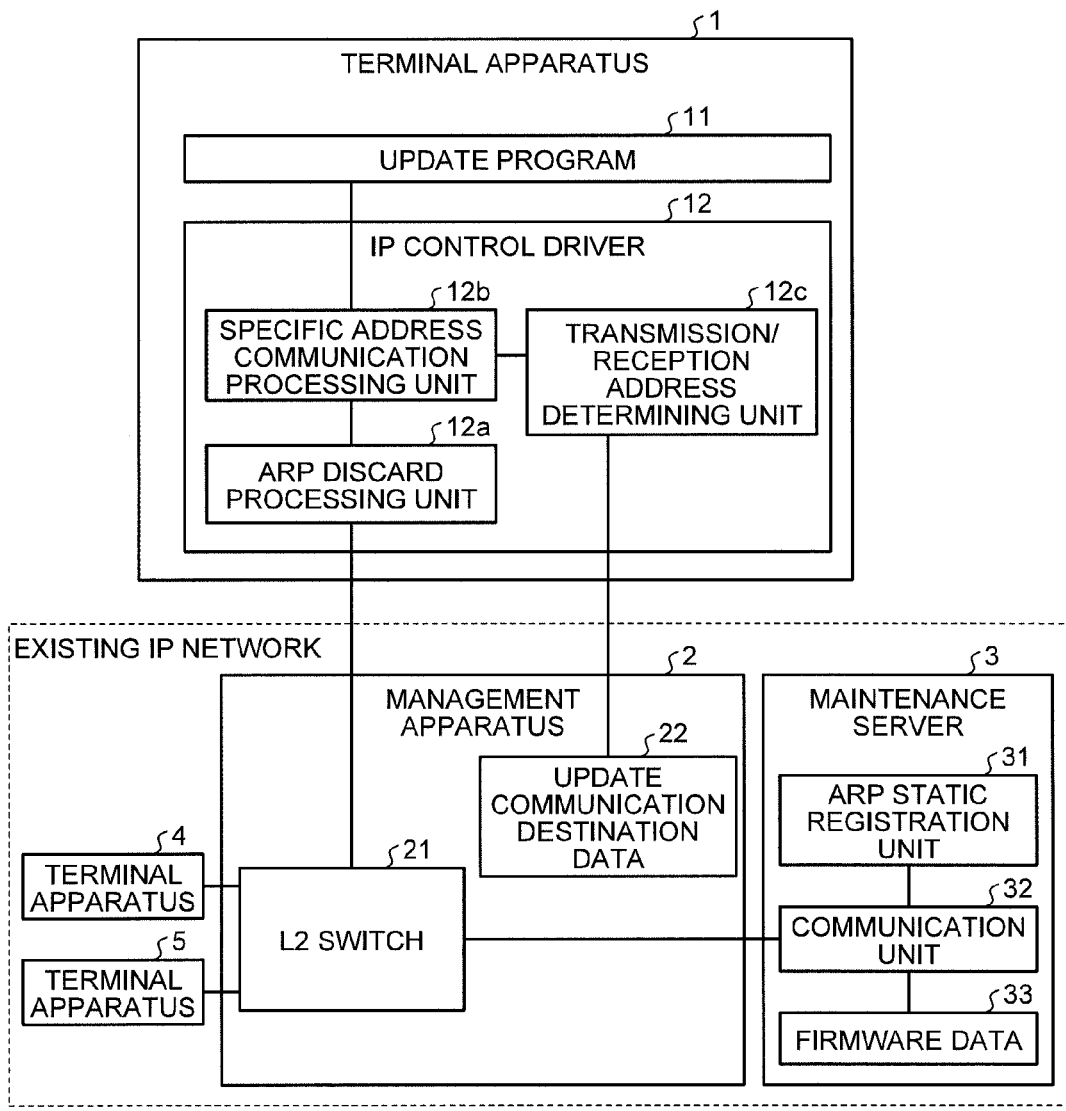
FIG. 1 is a diagram illustrating a schematic configuration of a communication control system according to an embodiment of the present invention.

FIG. 1 is a diagram illustrating a schematic configuration of a communication control system according to an embodiment of the present invention. The communication control system illustrated in FIG. 1 is an example of a system configuration in case where the communication control method according to the present invention is adopted to a firmware update for a terminal apparatus. FIG. 1 illustrates the condition in which a terminal apparatus 1, which is a subject whose firmware is to be updated, is newly connected to an existing IP network.

In the existing IP network illustrated in FIG. 1, a maintenance server 3, and terminal apparatuses 4 and 5 are connected to a management apparatus 2 that has an L2 switch 21 serving as a switching hub for connecting a LAN (Local Area Network) cable. The maintenance server 3, and the terminal apparatuses 4 and 5 are connected to the L2 switch 21 by the LAN cable, whereby they can make network communication.

The management apparatus 2 also holds update communication destination data 22 in addition to the L2 switch 21. The update communication destination data 22 is network information such as an IP address of the management apparatus 2 and the maintenance server 3.

The maintenance server 3 stores firmware data 33 used for updating the firmware. Since a communication unit 32 is connected to the L2 switch 21, the firmware data 33 can be provided to the other terminal apparatus via the IP network. The maintenance server 3 also has an ARP static registration unit 31. The ARP static registration unit 31 is a processing unit serving as a static address setting unit that temporarily stops an address resolution process based upon an address resolution request. The detail of the ARP static registration unit 31 will be described later.

In the terminal apparatus 1 that is the subject of the update of the firmware, an operating system (OS) is stopped, and firmware such as Extensible Firmware Interface (EFI) or Basic Input/Output System (BIOS) is operated. The IP address used when the OS is operated is monitored by intercluster communication or a network monitoring system, and it might perform unexpected operation in a conventional IP control driver.

Therefore, when the terminal apparatus 1 updates the firmware, an update program 11 that is an update program for updating the firmware starts an IP control driver 12, which is a communication control program different from the conventional IP control driver, wherein the IP control driver 12 sets an IP address as a terminal newly connected to an existing IP network.

Specifically, the terminal apparatus 1 joins the IP network by being connected to the L2 switch 21 via the LAN cable. With this, the terminal apparatus 1 and the maintenance server 3 are arranged on the same segment.

The terminal apparatus 1 is also connected to the management apparatus 2 with means other than the IP network, e.g., with a serial communication, thereby acquiring the update communication destination data 22 through the communication path other than the IP network.

A transmission/reception address determining unit 12c in the IP control driver 12 acquires the update communication destination data 22. The transmission/reception address determining unit 12c sets the IP address of the maintenance server 3 as a communication destination address, wherein it selects an address of own terminal from the addresses other than the communication destination address so as to determine the address used for the transmission and reception of the data.

A specific address communication processing unit 12b transmits data only to the communication destination address determined by the transmission/reception address determining unit 12c, and receives only the data from the communication destination address, thereby realizing a data communication, utilizing one-to-one IP packet, to the maintenance server 3.

An ARP discard processing unit 12a executes a process of discarding the address resolution protocol (ARP) request received from the L2 switch 21. This configuration can avoid the detection of the overlap of the address by the ARP, even when the IP address is overlapped with that of the other terminal connected to the IP network.

The ARP static registration unit 31 in the maintenance server 3 stops the address resolution process based upon the ARP for the address of the terminal apparatus 1, during the communication to the IP control driver 12.

Therefore, two specific apparatuses (terminal apparatus 1 and maintenance server 3) are logically separated from the network, and the IP communication can be established by using the IP address that is allowed to be overlapped in the segment. Further, an affect to the communication between other terminal apparatuses can be avoided.

Next, the affect to the communication by the ARP packet during the typical overlap of an IP address will be described with reference to FIGS. 2 to 4.

Figure 2:
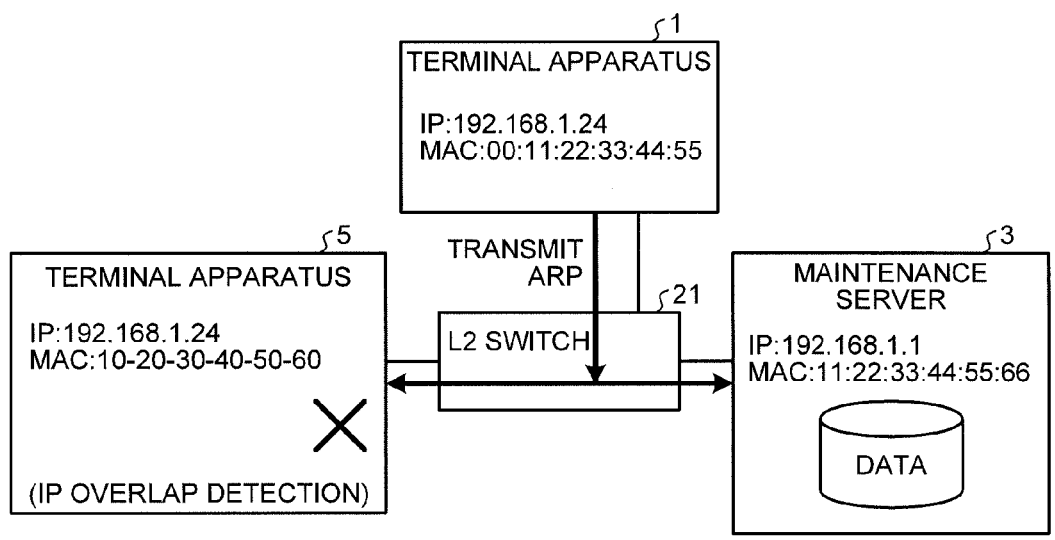
FIG. 2 is an explanatory view illustrating a transmission of an ARP request packet when an IP address is overlapped.

FIG. 2 is an explanatory view for describing a transmission of an ARP request packet when the IP address is overlapped. In the IP communication, an ARP packet is generally transmitted to acquire a MAC (Media Access Control) address of the communication destination. When the own IP is overlapped with the IP address of the other apparatus, this situation might affect the communication of the overlapped other apparatuses.

For example, when communication is made at the first time from the terminal apparatus 1 (IP address: 192.168.1.24, MAC address: 00:11:22:33:44:55) that is newly added to the maintenance server 3 (IP address: 192.168.1.1, MAC address: 11:22:33:44:55:66) that is the destination, the information described below is stored in a packet, and an ARP packet is transmitted in order to acquire the MAC address of the maintenance server 3 (IP address: 192.168.1.1) that is the destination.

Originator IP address: 192.168.1.24
Destination IP address: 192.168.1.1
Originator MAC address: 00-11-22-33-44-55
Destination MAC address: ff-ff-ff-ff-ff-ff The destination MAC address of the ARP packet transmitted by the terminal apparatus 1 is All '1', so that the L2 switch 21 transmits the packet to all ports. When the ARP packet transmitted to all ports reaches a terminal apparatus 5 having an IP address overlapped with the originator IP address, the terminal apparatus 5 detects the overlap of the IP address. The terminal apparatus detecting the overlap of the IP address might have a function of disconnecting the own network.

Specifically, the transmission of the ARP packet during the overlap of the IP address makes the other terminal apparatus impossible to make communication. Therefore, the IP control driver 12 does not transmit the ARP packet, different from the normal IP control driver.

Figure 3:
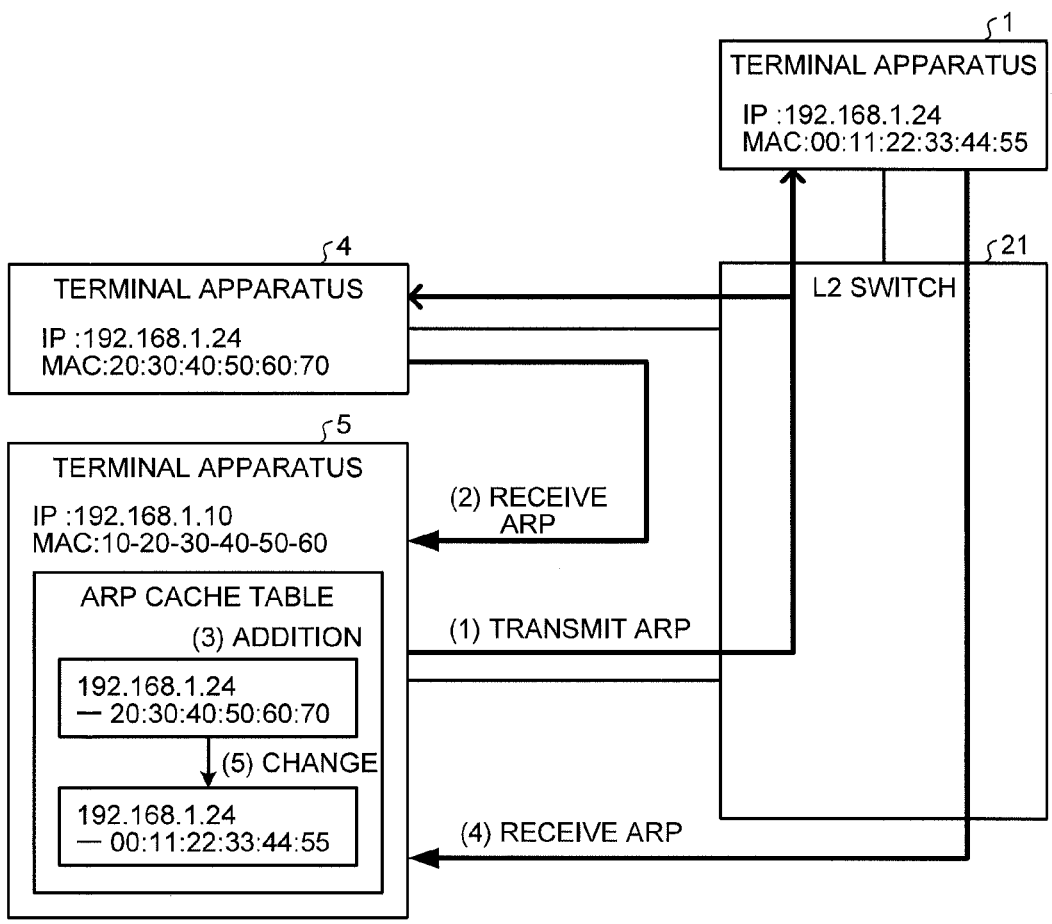
FIG. 3 is an explanatory view illustrating a reception of the ARP request packet when the IP address is overlapped.

FIG. 3 is an explanatory view for describing a reception of the ARP request packet when the IP address is overlapped. In the IP communication, a response is made to the ARP packet. When the IP address of the added terminal apparatus is overlapped with the IP address of the other terminal apparatus, this overlap might affect the communication of the other terminal apparatus.

For example, when the terminal apparatus 5 (IP address: 192.168.1.10, MAC address: 10-20-30-40-50-60) makes communication with a terminal apparatus 4 (IP address: 192.168.1.24, MAC address: 20-30-40-50-60-70) for the first time, the terminal apparatus 5 transmits the ARP packet storing the information described below with the operation same as that described with reference to FIG. 2.

Originator IP address: 192.168.1.10
Destination IP address: 192.168.1.24
Originator MAC address: 10-20-30-40-50-60
Destination MAC address: ff-ff-ff-ff-ff-ff When the terminal apparatus 1 (IP address: 192.168.1.24, MAC address: 00-11-22-33-44-55) that is newly added is overlapped with the IP address of the terminal apparatus 4, the terminal apparatus 4 and the terminal apparatus 1 respectively make a response to the ARP with respect to the ARP packet transmitted from the terminal apparatus 5.

When the response packet of the terminal apparatus 4 reaches the terminal apparatus 5 first, the MAC address (MAC address: 20-30-40-50-60-70) of the terminal apparatus 4 is registered as being associated with the IP address: 192.168.1.24 in an ARP cache table of the terminal apparatus 5.

However, when the response packet of the terminal apparatus 1 then reaches the terminal apparatus 5, the MAC address (MAC address: 00-11-22-33-44-55) of the terminal apparatus 1 is registered as being associated with the IP address: 192.168.1.24 in the ARP cache table of the terminal apparatus 5, whereby the registered content is changed. As a result, the communication between the terminal apparatus 5 and the terminal apparatus 4 is replaced by the communication between the terminal apparatus 5 and the terminal apparatus 1.

Specifically, when the added terminal apparatus 1 makes a response to the ARP packet during the overlap of the IP address, the communication between other communication terminals is affected by this operation. Therefore, the IP control driver 12 discards the received ARP packet, and does not make a response, different from the normal IP control driver.

Figure 4:
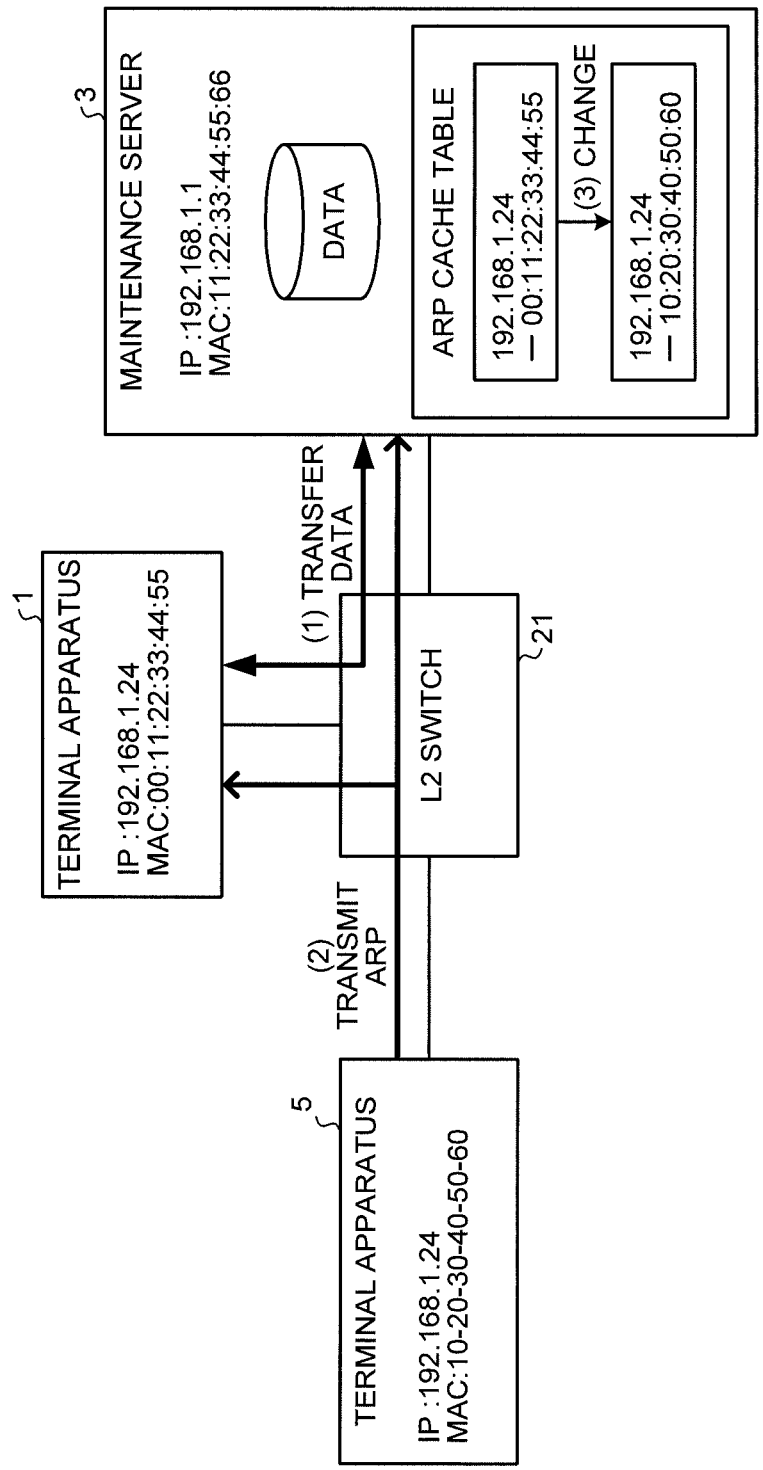
FIG. 4 is an explanatory view illustrating a reception of an ARP request packet from a terminal apparatus that has an overlapped IP address and that is currently transferring data.

FIG. 4 is an explanatory view for describing a reception of an ARP request packet from a terminal apparatus that has an overlapped IP address and that is currently transferring data.

When a packet such as ARP is received from the overlapped IP address even if the problem in FIGS. 2 and 3 are solved and the communication can be made, a communication path might sometimes be changed.

For example, when the terminal apparatus 1 (IP address: 192.168.1.24, MAC address: 00:11:22:33:44:55) and the maintenance server 3 (IP address: 192.168.1.1, MAC address: 11:22:33:44:55:66) are communicating with each other, the terminal apparatus 5 (IP address: 192.168.1.24, MAC address: 10-20-30-40-50-60) whose IP address is overlapped with the IP address of the terminal apparatus 1 might transmit an ARP request packet. The ARP request packet transmitted from the terminal apparatus 5 stores the information described below.

Originator IP address: 192.168.1.24
Destination IP address: 192.168.1.1
Originator MAC address: 10-20-30-40-50-60
Destination MAC address: ff-ff-ff-ff-ff-ff When the maintenance server 3 has a function of rewriting the ARP cache table based upon the information of the ARP request packet, the MAC address (MAC address: 10-20-30-40-50-60)) of the terminal apparatus 5 is registered as being associated with the IP address: 192.168.1.24 in the ARP cache table of the terminal apparatus 5, whereby the registered content is changed. As a result, the communication between the terminal apparatus 1 and the maintenance server 3 is replaced by the communication between the terminal apparatus 5 and the maintenance server 3.

Specifically, the transmission of the ARP packet by the existing terminal apparatus 5 during the overlap of the IP address affects the communication of the terminal apparatus 1. Therefore, the maintenance server 3 registers the IP address of the IP control driver 12 as a static address, which cannot be changed, by the ARP static registration unit 31. With this, even when the maintenance server 3 receives the ARP request from the overlapped terminal apparatus during the communication with the IP control driver 12, the change of the communication path can be avoided without updating the ARP cache table.

Figure 5:
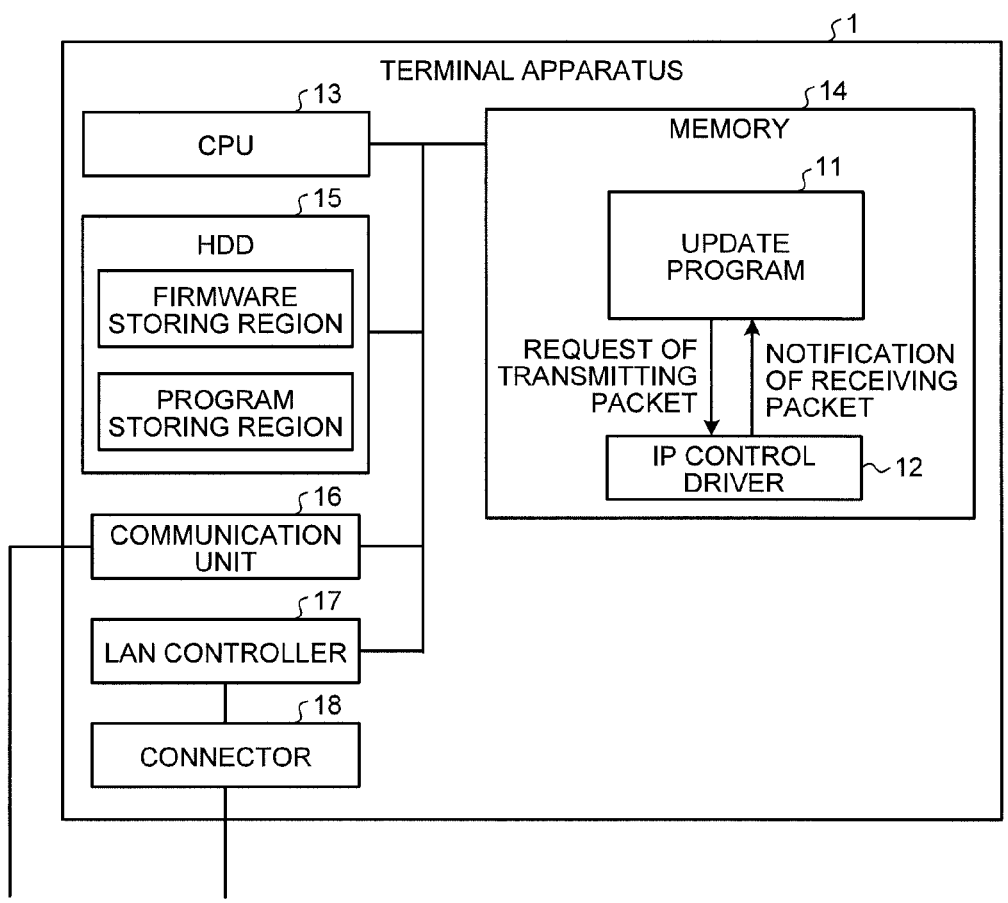
FIG. 5 is a diagram illustrating a physical configuration of a terminal apparatus.

FIG. 5 is a diagram illustrating a physical configuration of the terminal apparatus 1. As illustrated in FIG. 5, the terminal apparatus 1 includes a central processing unit (CPU) 13, a memory 14, a hard disk drive (HDD) 15, a communication unit 16, a LAN controller 17, and a connector 18.

The CPU 13 also functions as an operation device for a program (including firmware). The HDD 15 is provided with a firmware storing region and a program storing region for storing a program other than the firmware. The CPU 13 reads the program such as the firmware from the HDD 15 and expands the same in the memory 14, thereby realizing the function of the update program 11 of the firmware and the IP control driver 12.

The communication unit 16 is an optional interface other than LAN, and is used for acquiring the update communication destination data 22 from the management apparatus 2.

The connector 18 is a connecting way for connecting the LAN cable, and the LAN controller 17 is a communication interface through the LAN cable.

Figure 6:
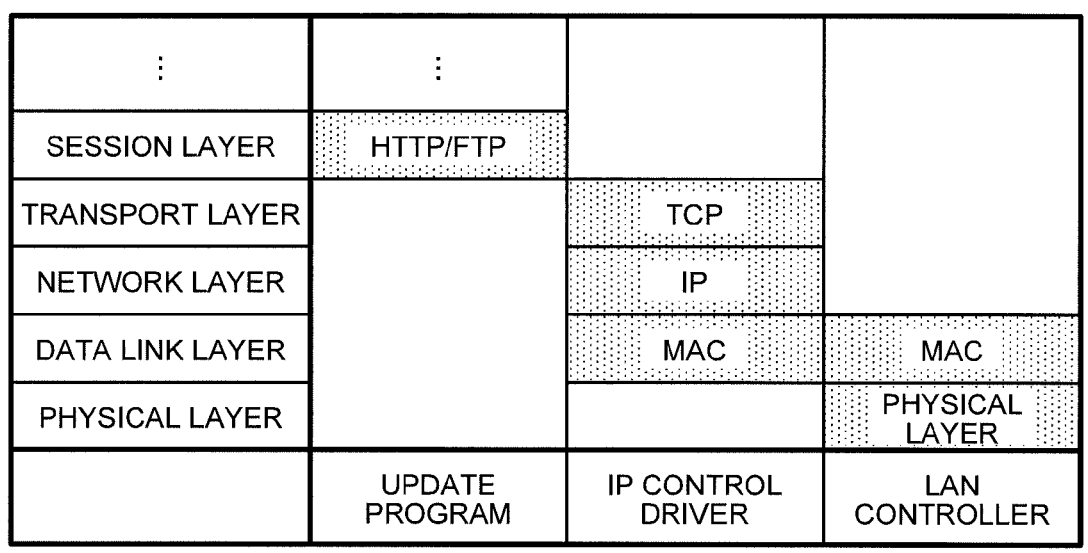
FIG. 6 is an explanatory view illustrating a process in each layer in an OSI basic reference model.

As illustrated in FIG. 6, in the terminal apparatus 1, the LAN controller 17 handles a physical layer in an Open Systems Interconnection (OSI) basic reference model. The LAN controller 17 and the IP control driver 12 handle a data link layer (communication using MAC address).

The IP control driver 12 handles a network layer (communication with IP) and a transport layer (communication with Transmission Control Protocol (TCP)). The firmware update program 11 handles a session layer (communication with Hypertext Transfer Protocol (HTTP) or File Transfer Protocol (FTP)).

Accordingly, when the update program 11 requests the transmission of the packet to the IP control driver 12, the IP control driver 12 transmits the IP packet via the LAN controller 17, as illustrated in FIG. 5. When the IP control driver 12 receives the IP packet via the LAN controller 17, the receipt notification of the packet is transmitted to the update program 11 from the IP control driver 12.

The operation of the IP control driver 12 will further be described with reference to FIGS. 7 to 10. FIG. 7 is an explanatory view illustrating an initialization process of the IP control driver 12, when the terminal apparatus 1 updates the firmware.

The update program 11 can acquire the IP address and the MAC address of the maintenance server 3, and the IP address and a network mask value of the management apparatus 2 from the management apparatus 2.

The loading and initialization of the IP control driver 12 are performed with the originator IP address and the IP address and the MAC address of the maintenance server 3 being defined as an argument. Thereafter, the update program 11 requests the transmission and reception of the packet to the IP control driver 12. In the transmission and reception of the packet, the upper layers from the session layer are processed in the update program 11.

The IP control driver 12 executes the initialization process of the IP control driver, a packet transmission process, and a packet reception process, under the request from the update program 11. In this case, the IP control driver 12 processes from the data link layer to the transport layer.

The LAN controller 17 is controlled by the IP control driver 12 so as to transmit and receive the packet. When receiving the packet, the LAN controller 17 checks whether the destination MAC address is the own MAC address (or all '1') or not, and if different, discards the packet. The processes other than this process are given to the IP control driver 12.

The initialization process of the IP control driver 12 will specifically be described. Firstly, the update program 11 reports the IP address and the MAC address of the maintenance server 3, which is the communication destination, to the IP control driver 12. Further, it reports an optional IP address, which can be overlapped, except for the IP address of the communication destination as the originator IP address.

The IP control driver 12 performs the initialization of the LAN controller 17 ((1) initialization), and stores the reported information pieces in the network information table ((2) store).

FIG. 8A is an explanatory view illustrating the packet transmission process of a conventional IP control driver. In the conventional IP control driver, when the packet transmission processing unit receives the request of transmitting the packet from the upper-level program ((1) request of transmitting packet), it requests the acquisition of the MAC address to the ARP control unit ((2) request of acquiring MAC).

The ARP control unit acquires the MAC address from the ARP cache table based upon the IP address of the communication destination, and reports the same to the packet transmission processing unit ((3) notification of MAC).

When the IP address of the communication destination has not yet been registered in the ARP cache table, the ARP control unit requests the issuance of the ARP packet to the ARP transmission processing unit. When the ARP packet is transmitted, the packet reception processing unit receives the response packet of the ARP, whereby the ARP control unit acquires the MAC address, reports the same to the packet transmission processing unit, and registers the same in the ARP cache table.

The packet transmission processing unit sends the IP address and the MAC address of the communication destination to a packet creation processing unit to create the packet ((4) packet creation). The packet creation processing unit performs the control process of TCP/IP with the use of a TCP control unit and an IP control unit, according to need, thereby creating a TCP header and an IP header, creating an IP packet, and sending the resultant to the packet transmission processing unit.

The packet transmission processing unit transmits the IP packet, which is sent from the packet creation processing unit, to the IP network through the LAN controller ((5) transmission of packet), and returns to the upper-level program ((6) return).

Figure 8B:
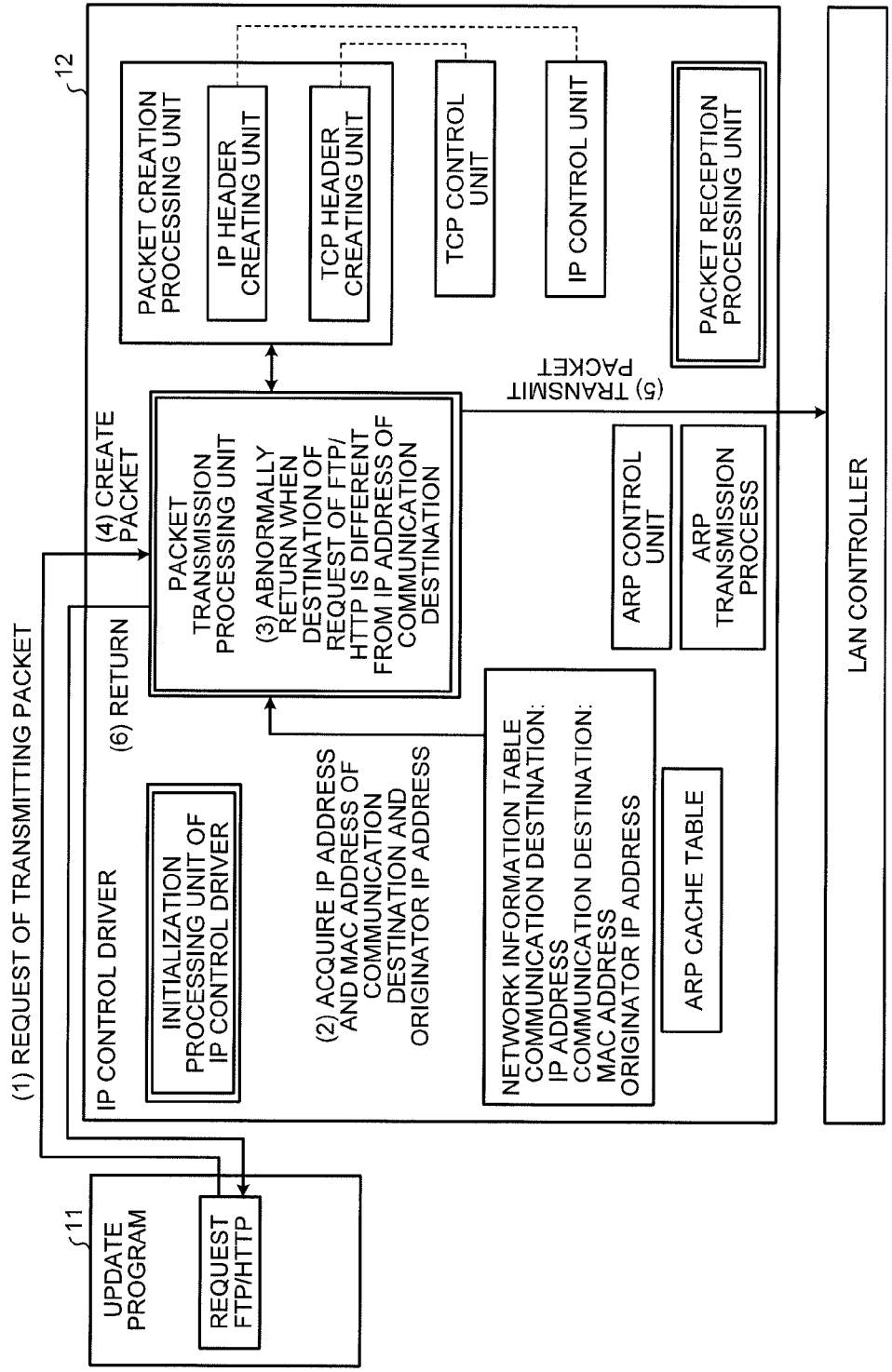
FIG. 8B is an explanatory view illustrating a packet transmission process of the IP control driver according to the embodiment.

FIG. 8B is an explanatory view illustrating a packet transmission process of the IP control driver 12 according to the embodiment. In contrast to the conventional IP driver, when the packet transmission processing unit in the IP control driver 12 receives the request of transmitting the packet from the update program 11 ((1) request of transmitting packet), the packet transmission processing unit acquires the IP address/MAC address of the communication destination stored in the initialization process without referring to the ARP cache and without issuing the ARP packet ((2) acquisition of IP address and MAC address of communication destination, and originator IP address).

The packet transmission processing unit checks whether or not the requested destination IP address agrees with the stored IP address of the communication destination. When they do not agree with each other, the IP control driver 12 immediately abnormally returns to the update program 11 ((3) abnormally return when the request destination of FTP/HTTP is different from the IP address of the communication destination).

When they agree with each other, the packet transmission processing unit sends the IP address and the MAC address of the communication destination to the packet creation processing unit to create the packet ((4) creation of packet). The packet creation processing unit performs the control process of TCP/IP with the use of a TCP control unit and an IP control unit, according to need, thereby creating a TCP header and an IP header, creating an IP packet, and sending the resultant to the packet transmission processing unit.

The packet transmission processing unit transmits the IP packet, which is sent from the packet creation processing unit, to the IP network through the LAN controller ((5) transmission of packet), and returns to the update program 11 ((6) return).

Figure 9A:
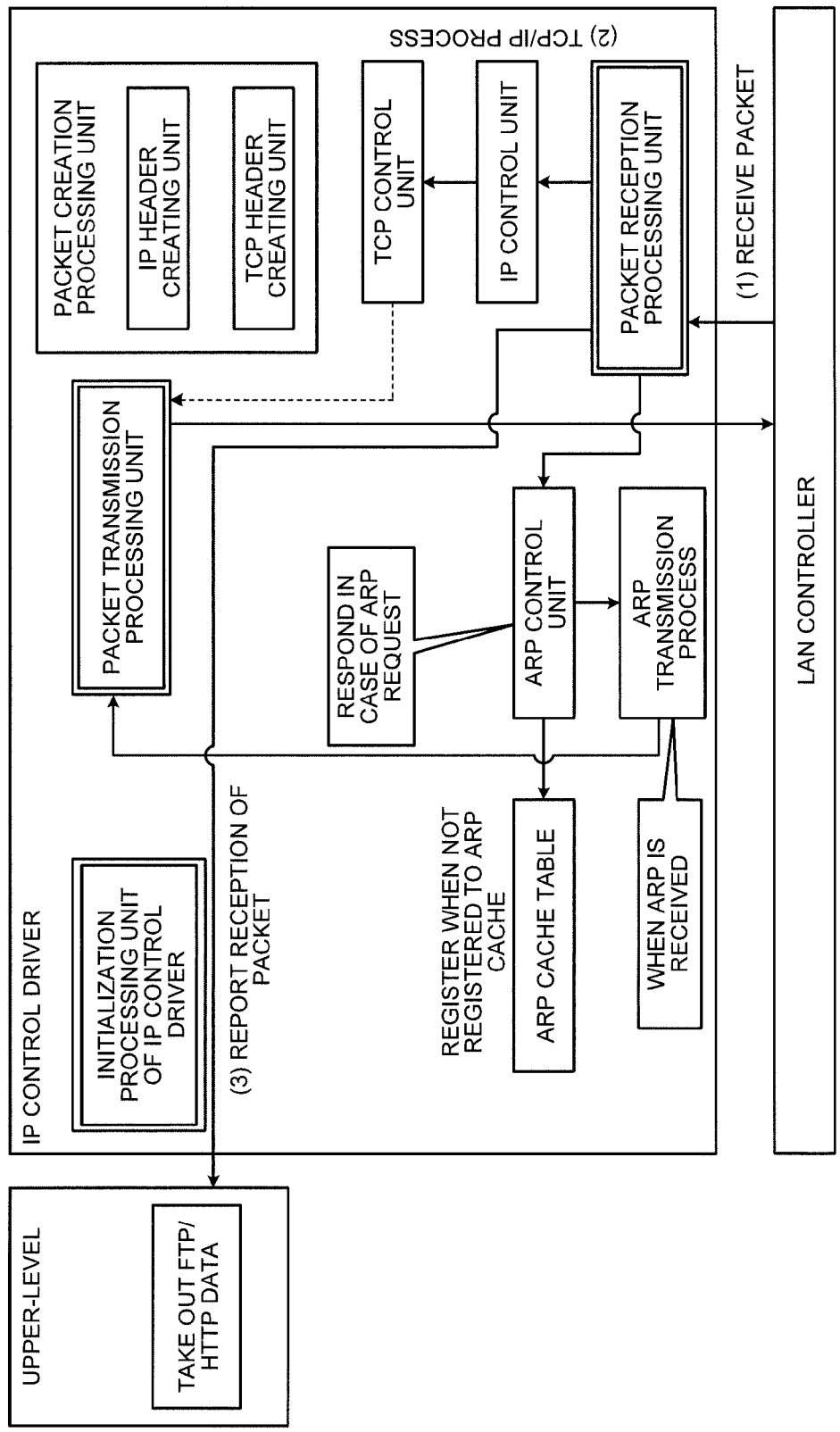
FIG. 9A is an explanatory view illustrating a packet reception process of a conventional IP control driver.

FIG. 9A is an explanatory view illustrating the packet reception process of a conventional IP control driver. In the conventional IP control driver, when the packet reception processing unit receives the IP packet ((1) reception of packet), the TCP control unit and the IP control unit perform the TCP/IP control process, according to need, ((2) TCP/IP process), thereby giving the data above the session layer to the upper-level program ((3) notification of packet reception).

In the conventional IP control driver, when the packet reception processing unit receives the ARP packet, the ARP control unit executes the process. When the received packet is the response to the ARP packet transmitted from the ARP control unit, the ARP control unit stores the IP address and the MAC address into the ARP cache table. When the received packet is the ARP request, the ARP transmission processing unit creates the ARP response packet, and issues the packet via the packet transmission processing unit.

Figure 9B:
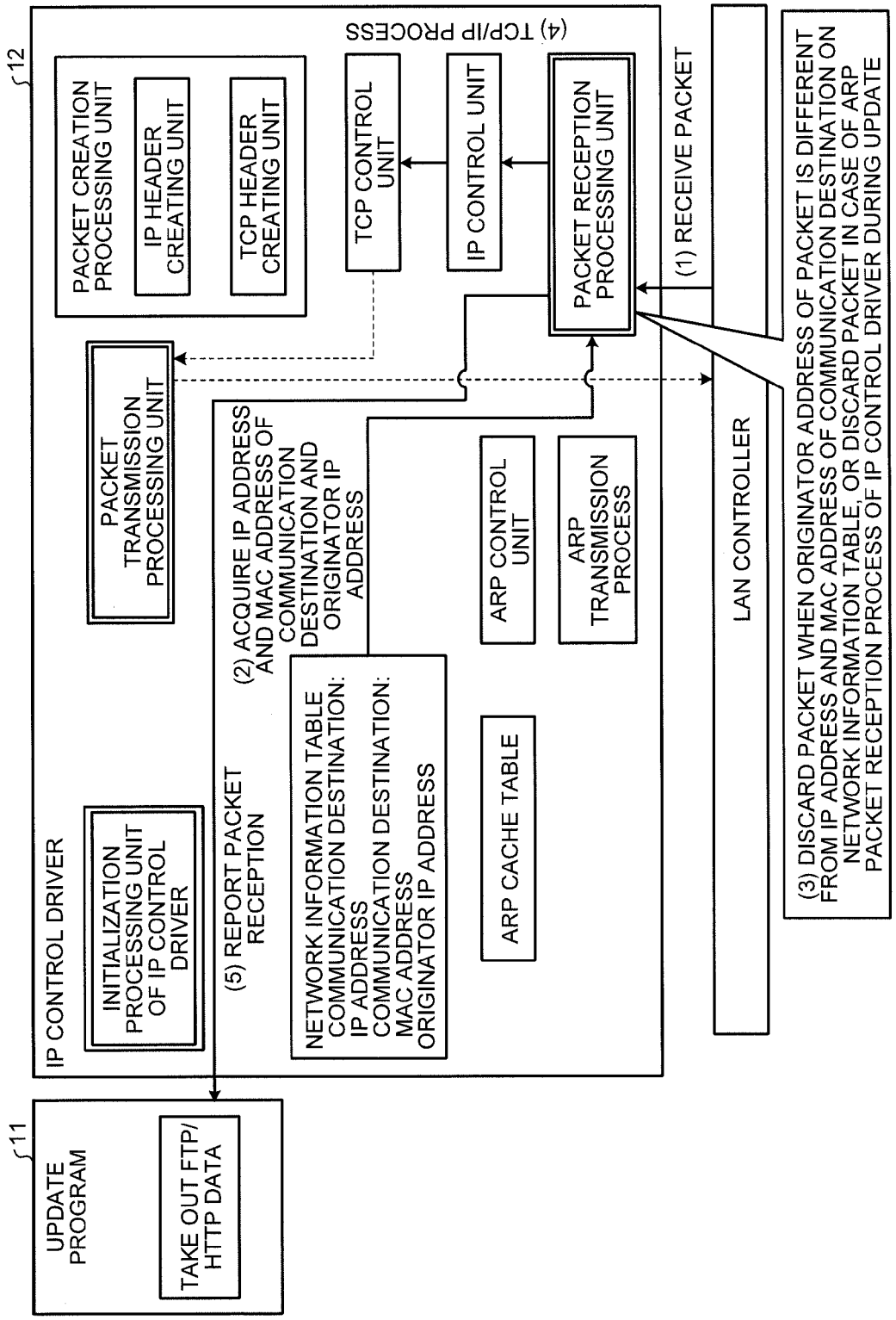
FIG. 9B is an explanatory view illustrating a packet reception process of the IP control driver according to the embodiment.

FIG. 9B is an explanatory view illustrating a packet reception process of the IP control driver 12 according to the embodiment. In contrast to the conventional IP control driver, in the IP control driver 12, when the packet reception processing unit receives the packet ((1) reception of packet), it immediately discards the packet, if the received packet is the ARP packet.

If the received packet is not the ARP packet, the packet reception processing unit acquires the originator IP address stored in the network information table ((2) acquisition of the IP address and the MAC address of the communication destination, and acquisition of the originator IP address) in order to fix the communication destination, and checks whether or not it agrees with the originator IP address of the received packet. When they do not agree with each other as a result of the check, it discards the packet.

Similarly, the packet reception processing unit checks whether the originator MAC address of the received packet agrees with the MAC address of the destination on the network information table. If they do not agree with each other, it discards the packet ((3) the packet is discarded, if the originator address of the packet is different from the IP address and the MAC address of the communication destination on the network information table. In the case of the ARP, the packet is discarded). When discarding the packet, the IP control driver 12 is again in the stand-by state for receiving the packet.

On the other hand, when the packet received by the packet reception processing unit is the IP packet, and the MAC address and the IP address agree with the content on the network information table, the TCP control unit and the IP control unit perform the TCP/IP control process, according to need, ((4) TCP/IP process), thereby giving the data above the session layer to the update program 11 ((5) notification of receiving packet). The update program 11 performs the HTTP/FTP control from the received data, and takes out the data.

Figure 10A:
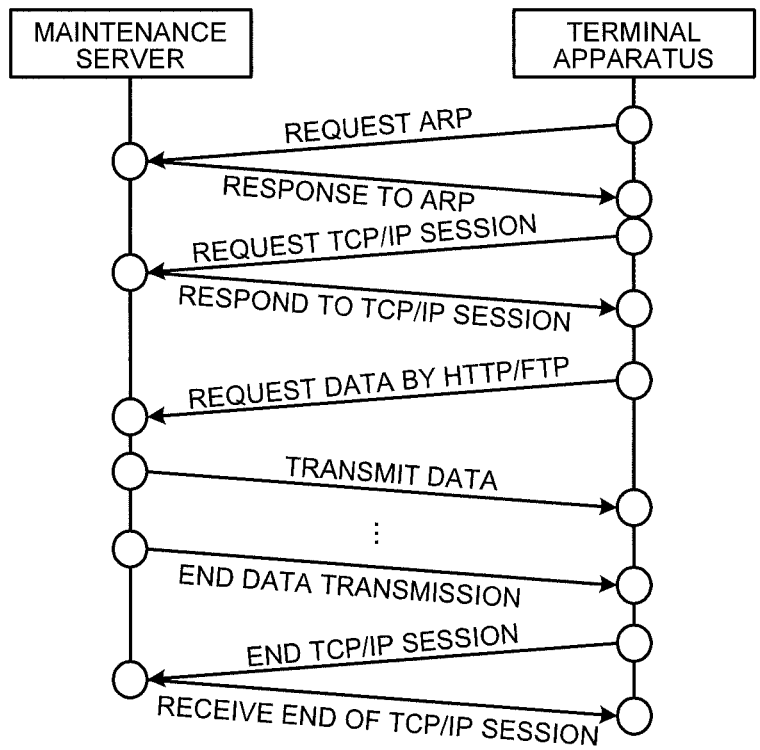
FIG. 10A is an explanatory view illustrating a network sequence of a conventional IP control driver.

The network sequence of the IP control driver will next be described with reference to FIGS. 10A and 10B. FIG. 10A is an explanatory view illustrating a network sequence of a conventional IP control driver. In the network sequence using the conventional IP control driver, the terminal apparatus transmits the ARP request packet to the communication destination (e.g., the maintenance server) so as to receive the ARP response.

Then, the terminal apparatus acquires the MAC address by the ARP response, requests the session of TCP/IP, requests data by the HTTP/FTP on receipt of the session response of the TCP/IP, and receives the transmission of data from the maintenance server. When the data transmission is ended, the terminal apparatus requests the end of the session of the TCP/IP to the maintenance server, and receives the end of the session of the TCP/IP, thereby completing the network sequence.

Figure 10B:
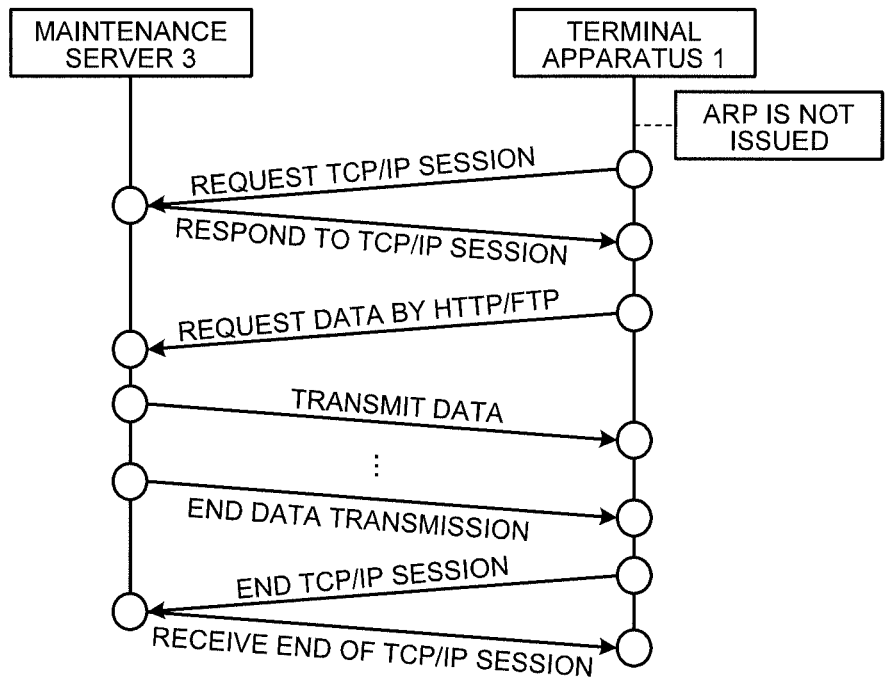
FIG. 10B is an explanatory view illustrating a network sequence of the IP control driver according to the embodiment.

FIG. 10B is an explanatory view illustrating a network sequence of the IP control driver 12 according to the embodiment. In contrast to the conventional IP control driver, in the network sequence of the IP control driver 12, the ARP cache table (the originator IP address and MAC address of the terminal apparatus 1 that is the subject in which the firmware is to be updated) is statically registered beforehand to the maintenance server 3, whereby the TCP/IP communication can be made without transmitting the ARP packet.

Specifically, the terminal apparatus 1 firstly requests the session of the TCP/IP, and then, requests the data by HTTP/FTP on receipt of the response of the session of the TCP/IP to receive the data transmission from the maintenance server 3. When the data transmission is ended, the terminal apparatus 1 requests the end of the session of the TCP/IP to the maintenance server 3, and receives the end of the session of the TCP/IP, thereby completing the network sequence.

As described above, the terminal apparatus 1 does not transmit the ARP packet. Therefore, the broadcast ARP packet is suppressed on the network, whereby there is no chance that the ARP packet derived from the terminal apparatus 1 reaches the other terminal apparatus.

In the state before the MAC address learning of the L2 switch 21, the packet of the TCP/IP is broadcasted. However, since the MAC address of the maintenance server is stored in the destination MAC address stored in the packet even when the broadcasted packet reaches the apparatus whose IP address is overlapped, the packet is discarded with the LAN controller. Therefore, there is no influence to the communication to the other terminal apparatus.

Specifically, the originator IP address, which can be overlapped with the other, of the packet issued from the terminal apparatus that is the subject in which the firmware is to be updated, does not reach the IP control unit of the other terminal apparatus, so that the IP address is not reported to the other terminal apparatus.

Then, the operation of the process of the update program 11 will be described with reference to FIG. 11. When the update program 11 is started, it acquires the IP address, the network address, and the MAC address of the maintenance server 3 from the management apparatus 2 with the use of serial communication (step S101).

Then, the update program 11 calculates the network address from the acquired information, and optionally selects the IP address other than the management apparatus 2 and the maintenance server 3 in the same segment (step S102).

Thereafter, the update program 11 reports the IP address optionally selected, and the IP address and the MAC address of the maintenance server to the IP control driver 12 so as to execute the initialization process of the IP control driver 12 and the LAN controller (step S103).

Next, the update program 11 is in a stand-by state for waiting a key input by an operator (step S104). During the stand-by state for waiting the key input, it statically registers the address of the terminal apparatus 1 to the ARP cache table by the maintenance server 3.

Until the static registration to the ARP cache table by the maintenance server 3 is ended, and the stand-by state is released due to the key input to the terminal apparatus 1, the update program 11 repeats the stand-by state for waiting the key input.

When the stand-by state is released (Yes in step S105), the update program 11 issues the packet of firmware data request with the HTTP/FTP (step S106).

Then, the update program 11 receives the firmware data with the HTTP/FTP (step S107), and updates the firmware data by using the received data (step S108). Thereafter, the update program 11 ends the process.

As described above, in the communication control system according to the present embodiment, the IP control driver 12 selects an optional IP address, which can be overlapped with the others, from the IP addresses in the same segment, except for the terminal apparatus (maintenance server 3) of the communication destination.

The network set information is sent and received beforehand to and from the terminal apparatus of the communication destination with a path other than the network. Specifically, the optionally selected IP address and the MAC address is given to the terminal apparatus of the communication destination, while the MAC address and the IP address of the communication destination are acquired.

The apparatus of the communication destination statically registers the IP address and the MAC address, which is used by the IP control driver 12, on the ARP cache table beforehand. Thus, the communication destination is not changed, even if the ARP packet is received, during the data transfer, from the terminal apparatus having the overlapped IP address.

The packet transmission process of the IP control driver 12 is changed to be fixed to the communication destination in order to perform the IP communication only with the apparatus of the communication destination. The packet reception process of the IP control driver 12 is changed in order to perform the IP communication only with the apparatus of the communication destination.

The IP control driver 12 does not issue the ARP, and does not process the received ARP packet.

As described above, the IP control driver 12 designates, to the added terminal apparatus, an optional IP address, which can be overlapped with the others, from the IP addresses in the same segment, except for the terminal apparatus of the communication destination, whereby the data communication utilizing one-to-one IP packet can be made with the specific apparatus.

Even when the IP address, which is overlapped with the IP address of the other terminal apparatus, is erroneously set, there is no influence to the communication of the other terminal apparatus.

Accordingly, when the present invention is applied to the update of the firmware of the terminal apparatus as described in the embodiment, for example, a maintenance worker (operator) can update the firmware only by giving an instruction to the application of the apparatus that is the subject of the update and by carrying out the static registration to the ARP cache table of the maintenance server. In this case, it is unnecessary to designate the IP address to the apparatus having the firmware to be updated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable, non-transitory medium storing a communication control program causing a network terminal to execute a process, the process comprising:
selecting an address of the network terminal from addresses other than an address of a communication destination to determine the address used for the transmission and reception of data, the communication destination defining network positional information of a specific terminal apparatus which is arranged on the same segment as the network terminal is arranged, the selected address being capable of being overlapped with an address of another terminal apparatus other than the specific terminal apparatus in the same segment and being an unchanged static address pre-registered with the specific terminal apparatus;
transmitting data only to the address of the communication destination; and
receiving only the data from the address of the communication destination.

2. The computer-readable, non-transitory medium according to claim 1, wherein the data is transmitted to and received from an IP (Internet Protocol) network, and the network positional information is an IP address.

3. The computer-readable, non-transitory medium according to claim 1, wherein the selecting includes acquiring at least one of the address of the communication destination and the address of the network terminal by using a path other than the network through which the data is transmitted and received.

4. The computer-readable, non-transitory medium according to claim 1, wherein the communication control program is started from an update program for updating software operating on the network terminal, wherein the data used for the update is acquired through the transmitting and receiving the data.

5. The computer-readable, non-transitory medium according to claim 4, wherein the specific terminal apparatus is a terminal apparatus that provides the data used for the update.

6. The computer-readable, non-transitory medium according to claim 5, wherein the specific terminal apparatus stops an address resolution process that is performed in response to an address resolution request during the data used for the update being provided.

7. A communication control apparatus, comprising:
a memory; and
a processor coupled to the memory, wherein
the processor executes a process comprising:
selecting an address of a network terminal from addresses other than an address of a communication destination to determine the address used for the transmission and reception of data, the communication destination defining network positional information of a specific terminal apparatus which is arranged on the same segment as the network terminal is arranged, the selected address being capable of being overlapped with an address of another terminal apparatus other than the specific terminal apparatus in the same segment and being an unchanged static address pre-registered with the specific terminal apparatus;
transmitting data only to the address of the communication destination; and
receiving only the data from the address of the communication destination.

8. A communication control system, comprising:
a terminal apparatus that is connected to an IP network, the terminal apparatus including:
a first memory; and
a first processor coupled to the first memory, wherein
the first processor executes a process comprising:
selecting an address of the terminal apparatus from addresses other than an address of a communication destination to determine the address used for the transmission and reception of data, the communication destination defining network positional information of a maintenance terminal apparatus which is arranged on the same segment as the network terminal is arranged, the selected address being capable of being overlapped with an address of another terminal apparatus other than the specific terminal apparatus in the same segment and being an unchanged static address pre-registered with the specific terminal apparatus, transmitting data only to the address of the communication destination, and receiving only the data from the address of the communication destination; and the maintenance terminal apparatus that is connected to the IP network, the maintenance terminal apparatus including:

a second memory; and a second processor coupled to the second memory, wherein the second processor executes a process comprising:

providing maintenance data through the communication with the terminal apparatus, and stopping an address resolution process that is performed in response to an address resolution request for the address of the terminal apparatus during the communication with the terminal apparatus.

\* \* \* \* \*